United States Patent
Wu et al.

(10) Patent No.: US 10,140,485 B2
(45) Date of Patent: Nov. 27, 2018

(54) PAIRING METHOD FOR WIRELESS SCANNER VIA RFID

(71) Applicant: HAND HELD PRODUCTS, INC., Fort Mill, SC (US)

(72) Inventors: Jerry Wu, Jiangsu (CN); Jianfeng Gao, Jiangsu (CN); Hong Jian Jin, Jiangsu (CN)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

(21) Appl. No.: 15/419,313

(22) Filed: Jan. 30, 2017

(65) Prior Publication Data

US 2017/0140185 A1   May 18, 2017

Related U.S. Application Data

(63) Continuation of application No. 13/973,354, filed on Aug. 22, 2013, now Pat. No. 9,558,381.

(30) Foreign Application Priority Data

Aug. 31, 2012   (CN) .......................... 2012 1 0321196

(51) Int. Cl.
    *G06K 7/10*   (2006.01)
    *G06K 19/07*   (2006.01)

(52) U.S. Cl.
    CPC ..... *G06K 7/10386* (2013.01); *G06K 19/0727* (2013.01)

(58) Field of Classification Search
    CPC ........... G06K 7/10009; G06K 7/10386; G06K 7/10475
    USPC .................................................. 235/439, 440
    See application file for complete search history.

(56) References Cited

U.S. PATENT DOCUMENTS

| | | |
|---|---|---|
| 2004/0253923 A1 | 12/2004 | Braley et al. |
| 2007/0284441 A1 | 12/2007 | Walczyk et al. |
| 2009/0319644 A1 | 12/2009 | Fagioli et al. |
| 2010/0007496 A1 | 1/2010 | Orlassino |
| 2011/0117848 A1 | 5/2011 | Tanaka |

(Continued)

FOREIGN PATENT DOCUMENTS

| | | |
|---|---|---|
| CN | 1920873 A | 2/2007 |
| CN | 101317398 A | 12/2008 |
| CN | 102118490 A | 7/2011 |

OTHER PUBLICATIONS

Mar. 22, 2017 Office Action issued in Chinese Patent Application No. 201210321196.5.

(Continued)

*Primary Examiner* — Toan Ly
(74) *Attorney, Agent, or Firm* — Oliff PLC; R. Brian Drozd

(57) ABSTRACT

A wireless scanner is described that performs a pairing operation with a wireless scanner base before commencing scanning operations in a wireless scanner network. Radio frequency identification (RFID) is used to achieve the pairing operation of the wireless scanner with the wireless scanner base by using an RFID tag associated with the wireless scanner base. The RFID tag in the wireless scanner base may contain pairing information such as a network address of the wireless scanner base for use in automatically establishing a wireless communication session with the wireless scanner base in accordance with another wireless protocol.

18 Claims, 4 Drawing Sheets

(56) References Cited

U.S. PATENT DOCUMENTS

2012/0062363 A1    3/2012  St. George et al.
2013/0029596 A1*  1/2013  Preston ................ H04W 8/005
                                                                   455/41.1
2013/0136033 A1    5/2013  Patil et al.

OTHER PUBLICATIONS

Dec. 18, 2015 Office Action issued in British Patent Application No. 1315404.2.
Feb. 24, 2014 Office Action issued in British Patent Application No. 1315404.2.
Sep. 14, 2017 Office Action issued in Chinese Patent Application No. 201210321196.5.
Jan. 24, 2018 Office Action issued in Chinese Patent Application No. 201210321196.5.

\* cited by examiner

PAIRING METHOD FOR WIRELESS SCANNER VIA RFID

CROSS-REFERENCE TO RELATED APPLICATIONS

This is a Continuation of application Ser. No. 13/973,354 filed Aug. 22, 2013, which claims the benefit of Chinese Patent Application No. 201210321196.5 filed Aug. 31, 2012. The disclosure of the prior applications is hereby incorporated by reference herein in its entirety.

TECHNICAL FIELD

This disclosure relates to wireless scanners and, more particularly, to techniques for uniquely pairing a handheld wireless scanner with a wireless scanner base.

BACKGROUND

Wireless scanners are handheld devices used in many applications including bar code decoding and industrial data collection. A wireless scanner usually comprises a mobile computer, keypad, and data acquisition device. The mobile computer typically includes a hand held or "pocket" computing device and a keypad in a variety of configurations. The data acquisition device is typically an image capture device, such as a line scanner or an image sensor array, and is often used to capture image data, such as bar codes. Data may also be acquired by the keypad or a touch pad associated with the mobile computer. The wireless scanner is typically paired to a wireless scanner base for purposes of data communication with a remote computer.

Within a wireless scanner, the mobile computer is equipped with a radio transceiver which may have operating modes wherein the mobile computer can transmit and receive data from a computer or other device in a wireless scanner network. In some cases, it is desired that the mobile computer communicate with only one out of several possible radio transceiver equipped computers in an operating environment. One such operating environment is a retail store network wherein a mobile computer in the form of a hand held bar code reading terminal must be associated with one specific cash register including an associated radio transceiver. In a retail store network, it is required that one bar code reading terminal be paired with a single cash register system so that product code information intended for processing by a first cash register is not erroneously associated with a retail transaction processed by a second cash register. This point-to-point relationship is referred to as "pairing" the wireless scanner with the cash register.

SUMMARY

This disclosure describes techniques in which a wireless scanner utilizes radio frequency identification (RFID) to automatically achieve a pairing operation with a wireless scanner base using an RFID tag in the wireless scanner base. An RFID module may be integrated in the wireless scanner and used to read an RFID tag in the wireless scanner base. The user may initially place the wireless scanner with the integrated RFID module near to the RFID tag in the wireless scanner base. The wireless scanner is placed in a pairing mode of operation in which the wireless scanner uses its integrated RFID reader to read the RFID tag in the wireless scanner base to automatically complete a pairing operation with the wireless scanner base. The RFID tag in the wireless scanner base may contain pairing information such as the address of the wireless scanner base.

In one example, a method comprises reading an RFID tag installed into one of a plurality of wireless scanner bases with an RFID reader integrated into the wireless scanner. The controller in the wireless scanner receives, from the RFID reader in the wireless scanner, the RFID tag address of the RFID tag installed in the wireless scanner base. The wireless scanner may then notify the user via an indicator light that the wireless scanner has obtained the RFID tag address of the wireless scanner base. The wireless scanner may then prompt the user for confirmation that the user approves of wirelessly connecting from the wireless scanner to the wireless scanner base indicated by the RFID tag address. The wireless scanner may then receive from the user a trigger signal confirming that the user approves wirelessly connecting from the wireless scanner to the wireless scanner base indicated by the RFID tag address. If the user approves, then the wireless scanner may complete the operation by wirelessly connecting to the wireless scanner base indicated by the RFID tag address.

In another example, a system comprises a wireless scanner with a plurality of wireless scanner bases external to the wireless scanner. The wireless scanner comprises a radio transceiver, an RFID reader, an actuator, an indicator, and an external housing encapsulating the wireless scanner components. The wireless scanner housing is configured so that a user can trigger the actuator when grasping the housing. The wireless scanner is configured to enter a unique association mode of operation subsequent to receiving an RFID address from one of the wireless scanner bases and the user triggering the actuator to confirm acceptance of the RFID tag address of the wireless scanner base.

The invention may provide one or more advantages. For example, automated RFID-based pairing may be considerably more convenient and less prone to error than manual configuration. Moreover, use of an RFID tag may require less maintenance and be more reliable than use of printed indicia on the wireless scanner base, such as a bar code. A bar code, for example, may be easily polluted or damaged and the required maintenance may be inconvenient to the user. An RFID tag may also be easier to scan than a bar code as the RFID tag need only to be in close proximity to the RFID antenna integrated in the wireless scanner whereas a bar code must be optically aligned with a bar code reader in order to be read.

The details of one or more examples are set forth in the accompanying drawings and the description below. Other features, objects, and advantages in addition to those described below will be apparent from the description and drawings, and from the claims.

DETAILED DESCRIPTION

Figure 1:
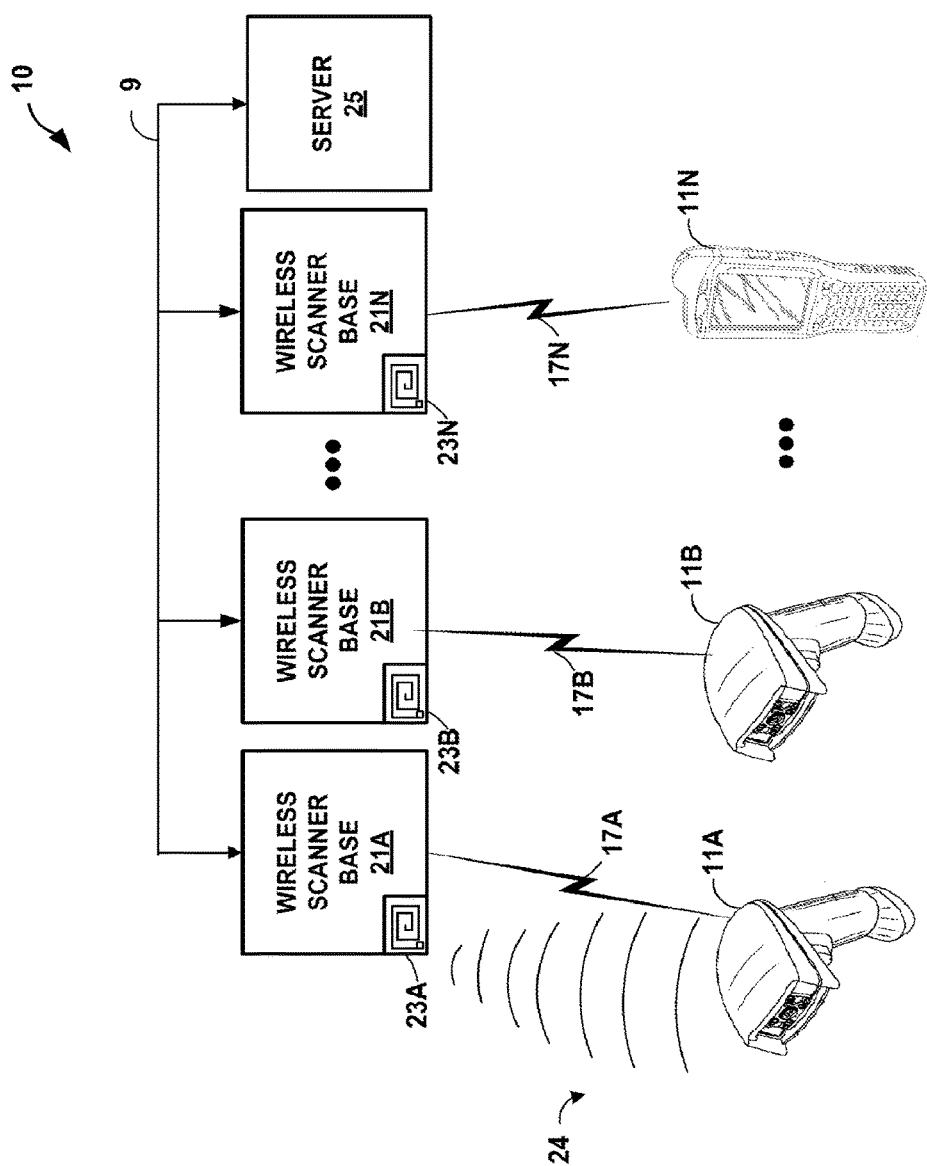
FIG. 1 is a diagram illustrating a wireless scanner network in which wireless scanners utilize the techniques described herein to uniquely and automatically establish peering sessions with corresponding base stations.

FIG. 1 is a diagram of a wireless scanner network 10 having a plurality of wireless scanners 11A-11N, a plurality of wireless scanner bases 21A-21N, and a central server 25. In the example of FIG. 1, scanners 11A (referred to herein collectively as "scanners 11") collect data, such as by scanning bar codes of particular items or by receiving input from an operator. For example, wireless scanner network 10 may be implemented in a retail store environment where each wireless scanner is associated with a different checkout counter or register. In this case, an operator typically utilizes a scanner 11 to scan bar code information from each item being purchased so as to identify the item.

In this setting, each of scanners 11 is uniquely associated with, i.e., "paired with," one of wireless scanner bases 21. Each of scanner bases 21 may be communicatively coupled to, or part of, an electronic cash register or other point-of-sale device. That is, each of scanners 11 and a corresponding base 21 establish a point-to-point RF communication session such that data and commands are communicated only between the two "peer" devices without being processed by the other devices of wireless scanner network 10. Each wireless scanner 11 transfers acquired data, such as a bar code of a scanned item, to the wireless scanner base 21 with which the wireless scanner is paired. In one example, wireless scanner 11A is uniquely associated with wireless scanner base 21A, wireless scanner 11B is uniquely associated with wireless scanner base 21B, and wireless scanner 11N is uniquely associated with wireless scanner base 21N. Wireless scanner bases 21 may all be provisioned with similar components or may be different, such as base stations integrated with our connected to different types of point-of-sale registers. Each of wireless scanner bases 21 includes a radio transceiver for RF communications of commands and data with the correspondingly paired wireless scanner 11. As examples, wireless scanner base 21A may include a USB dongle network interface card (NIC) plugged into the back of a main housing, and wireless scanner base 21B may include a radio transceiver in the form of a PC card NIC plugged into an internal bus.

Wireless scanner network 10 also includes server 25, which represents any suitable computing environment for application and database software, depending upon the application. In the example of FIG. 1, server 25 is in communication with wireless scanner bases 21A-21N by way of local area network 9 as may be provided by an Ethernet network. Server 25 is typically located on-site, for example, at a retail store together with wireless scanners 11A-11N and wireless scanner bases 21A-21N.

It can be seen with reference to a retail store network that if wireless scanners 11A-11N had the ability to freely associate with any of wireless scanner bases 21A-21N then considerable errors in the collection of transaction data would likely occur. For example, if wireless scanner 11A were able to freely associate with any cash register of wireless scanner network 10, then data sent by wireless scanner 11A intended for processing by cash register 21A might inadvertently be sent to cash register 21B and cash register 21N to corrupt transaction data being processed by each of the cash registers. In one embodiment, transaction data, including price and account data, may have an attached transaction number. If message data is sent from a wireless scanner to a cash register other than the intended cash register, the message data, price, and item information derived using the message data can be expected to have an erroneous transaction number attached.

As described herein, wireless scanners 11 utilize radio frequency identification (RFID) to automatically achieve a pairing operation with a corresponding wireless scanner base 21 using an RFID tag 23 affixed to each wireless scanner base. For example, wireless scanner 11A may achieve a pairing operation with wireless scanner base 21A utilizing RFID tag 23A in the wireless scanner base. Moreover, wireless scanners 11 support a mode of operation in which the pairing is achieved and a corresponding point-to-point wireless communication session 17 is established automatically in response to interrogation of the RFID tag 23. For example, a user may scan RFID tag 23A in wireless scanner base 21A with an RFID module integrated into wireless scanner 11A by placing the RFID antenna inside the wireless scanner in close proximity with the RFID tag in the wireless scanner base and reading the RFID tag with the integrated RFID tag reader module. RFID tag 23A in wireless scanner base 21A is typically read using near field radio waves 24 to electromagnetically couple the RFID antenna in wireless scanner 11A with the RFID tag. The integrated RFID reader generates radio wave signal 24, typically at 13.56 MHz, which is broadcast by the RFID antenna in wireless scanner 11A to the RFID tag 23A in wireless scanner base 21A. RFID tag 23A is energized by radio wave signal 24 from wireless scanner 11A and transmits a return radio wave signal to the RFID antenna in the wireless scanner during time periods when radio wave signal 24 is turned off. The integrated RFID reader in wireless scanner 11A receives the RFID tag radio signal from the antenna in the wireless scanner and decodes this signal into decoded data, such as an RFID tag address. The wireless scanner bases 21 are typically located sufficiently far apart, e.g., more than 1-2 meters typically, so that the wireless scanners 11 may avoid obtaining unintended RFID tag addresses using the integrated RFID readers. If the integrated RFID readers in wireless scanners 11 are low power, e.g., less than 1 Watt, wireless scanner bases 21 may be allowed to be placed apart by less than 2 meters.

RFID tags may be used at several frequencies, such as low frequency (LF) 125 kHz, high frequency (HF) 13.56 MHz, ultra high frequency (UHF) 433 MHz or 915 MHz, and microwave 2.45 GHz. The least costly RFID tags to manufacture are typically HF (13.56 MHz) and UHF (915 MHz). Because of the longer typical read range of UHF RFID tags (10 meters) versus HF RFID tags (1 meter), it is more likely that HF RFID tags would be used within wireless scanner bases 21 in a retail setting where the wireless bases may be cash registers which are located within a few meters, i.e. 3 meters or less, of each other.

Wireless scanner 11A may use the RFID tag address or other decoded data obtained from RFID tag 23A using the RFID protocol as an identifier for pairing with wireless scanner base 21A. In one example, the RFID tag address from RFID tag 23A may be used as an index into a translation table which gives another identifying address for wireless scanner base 21A for a second protocol used in wireless communication session 17A between wireless scanner 11A and wireless scanner base 21A. In another example, data following the tag address in RFID tag 23A may contain address information for wirelessly communicating between wireless scanner 11A and wireless scanner base 21A. The wireless transmissions may use, for example, the Bluetooth or 802.11 standard protocols to establish a point-to-point communication session between wireless scanner 11A and wireless scanner base 21A. In a wireless operating mode, the mobile computer in wireless scanner 11A senses that it is in range of a radio equipped computer device such as wireless scanner base 21A, and a communication protocol commences to link the pair of radio transceiver equipped computers together, i.e., to form a wireless connection between the wireless scanner and the wireless scanner base.

The techniques described herein may provide one or more advantages. For example, automated RFID-based pairing may be considerably more convenient and less prone to error than manual configuration. Moreover, RFID tags 23 of wireless scanner bases 21 may be more reliable than indicia printed on wireless scanner bases 21, such as bar codes, because the RFID tags may be affixed internally in the wireless scanner bases and not suffer from potential abrasion, soiling, or corrosion. Another advantage of the pairing method for wireless scanners with RFID is that RFID tags 23 of wireless scanner bases 21 may require less maintenance than bar codes because the RFID tags are less likely to be polluted or damaged. RFID tag 23A of wireless scanner base 21A may also be easier to scan than a bar code as the RFID antenna in wireless scanner 11A need only be placed closely to the RFID tag for scanning rather than a bar code which must be optically aligned with the wireless scanner.

Figure 2A:
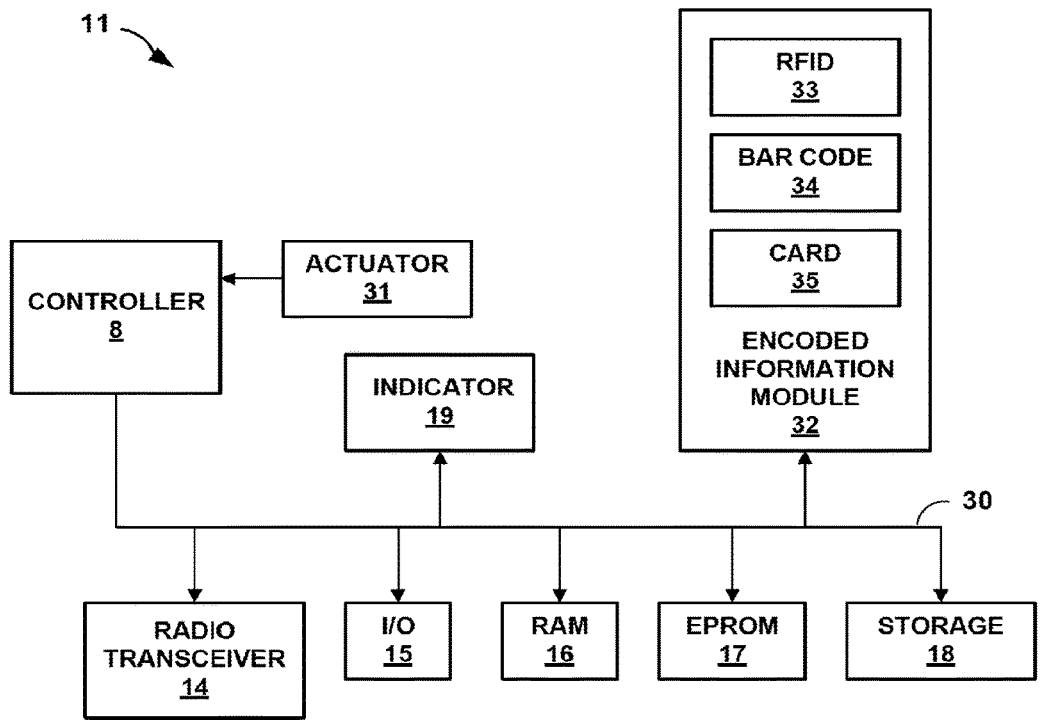
FIG. 2A is a block diagram showing an example wireless scanner in accordance with the techniques described herein.
Figure 2B:
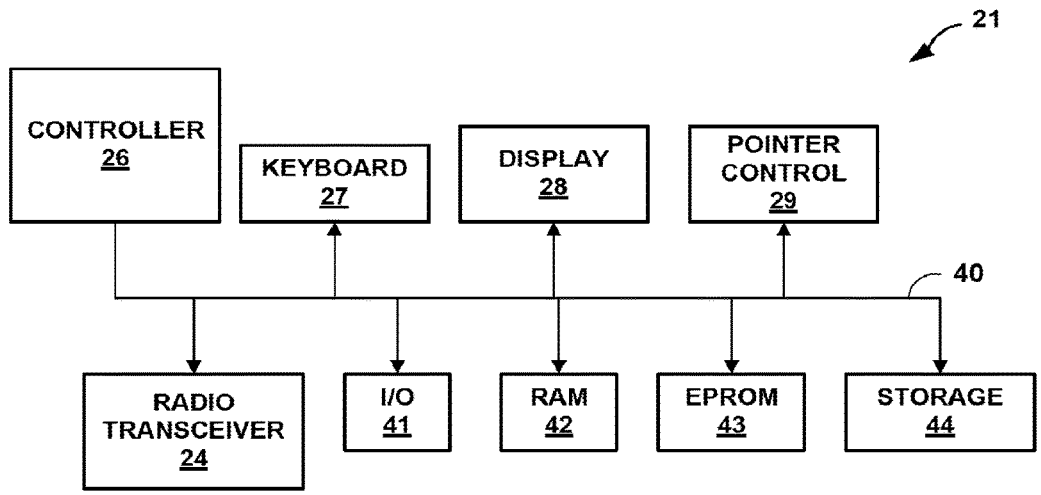
FIG. 2B is a block diagram showing an example wireless scanner base in accordance with the techniques described herein.

FIGS. 2A and 2B are block diagrams that illustrate an example wireless scanner 11 and an example wireless scanner base 21, respectively, that may operate in accordance with the techniques described herein to establish a peer relationship using RFID. Wireless scanner 11 and the wireless scanner base 21 each include a radio transceiver 14 that operates in accordance with a first RF protocol. In one embodiment, wireless scanner 11 may include Bluetooth radio transceiver 14 for establishment of a point-to-point wireless communication session with a Bluetooth radio transceiver 24 of wireless scanner base 21. Wireless scanner 11 and a wireless scanner base 21 include controllers 8 and 26, respectively, which may provide an operating environment for executing the Bluetooth protocol stack. The Bluetooth stack may be included in each of wireless scanners 11 and wireless scanner bases 21 of wireless scanner network 10 of FIG. 1.

Additional components may be incorporated into wireless scanner 11. As part of encoded information module 32, wireless scanner 11 may include data acquisition electronics for RFID 33, bar code 34, and smart card 35. Bar code module 34 may include an image sensor system which may be operated by controller 8. In response to receipt of a trigger signal as may be initiated by depressing actuator 31, controller 8 may send frame capture commands via scanner system bus 30 to the image sensor system of bar code module 34. In addition or in place of having bar code module 34, wireless scanner 11 may include RFID module 33 and card reader unit 35. When placed in auto-pairing mode of operation, as described herein, controller 8 may operate RFID module 33 to acquire a tag address and/or other data from an RFID tag (e.g., RFID tag 23 of FIG. 1), and use the tag address and/or other data from the RFID to automatically establish a wireless communication session with a corresponding wireless scanner base 21. For example, controller 8 may use the RFID tag address and/or other data to compute or otherwise determine an address for wirelessly communicating with wireless scanner base 21 using a second RF protocol (e.g., Bluetooth) via radio transceiver 14. Wireless scanner 21 may also include a program memory or EPROM 17, a working memory or RAM 16, storage memory 18 such as a hard drive, and indicator 19. Wireless scanner 21 may also include input/output (I/O) interface 15 such as an Ethernet or USB interface. All of the above components described relative to wireless scanner 11 may be incorporated in a portable hand held housing 51 as shown in FIG. 3A which can be operated at a location spaced apart from wireless scanner base 21.

Wireless scanner base 21 may include additional components such as controller 26, keyboard 27, display 28, pointer controller 29, and radio transceiver 24 as described previously, I/O interface 41, a working memory or RAM 42, a program memory or EPROM 43, and storage memory 44 such as a hard drive. The components may be in communication with each other via scanner base system bus 40. Controller 26 may operate radio transceiver 24 to wirelessly communicate with wireless scanner 11 to complete the pairing operation with wireless scanner base 21 and establish a point-to-point wireless communication session for transfer of data from the wireless scanner.

Because encoded information module 32 of wireless scanner 11 can decode multiple forms of message data, it is understood in all instances described herein where it is described that wireless scanner 11 sends decoded message data to wireless scanner base 21, wireless scanner 11 could alternatively send decoded message data such as decoded RFID message data, decoded bar code message data, or decoded smart card message data. Wireless scanner 11 may be configured so that the wireless scanner decodes encoded data in response to a user initiated command. Such a user-initiated command may be initiated in response to actuator 31 being triggered, or in the case of card reader 35, a card being moved through a slot disposed on wireless scanner 11 (not shown). Where wireless scanner 11 incorporates an RFID reader/writer 33 (referred to herein as an "RFID reader"), the wireless scanner may be referred to as an RFID reading terminal. Where wireless scanner 11 incorporates bar code reader 34, the wireless scanner may be referred to as a bar code reading terminal.

Figure 3A:
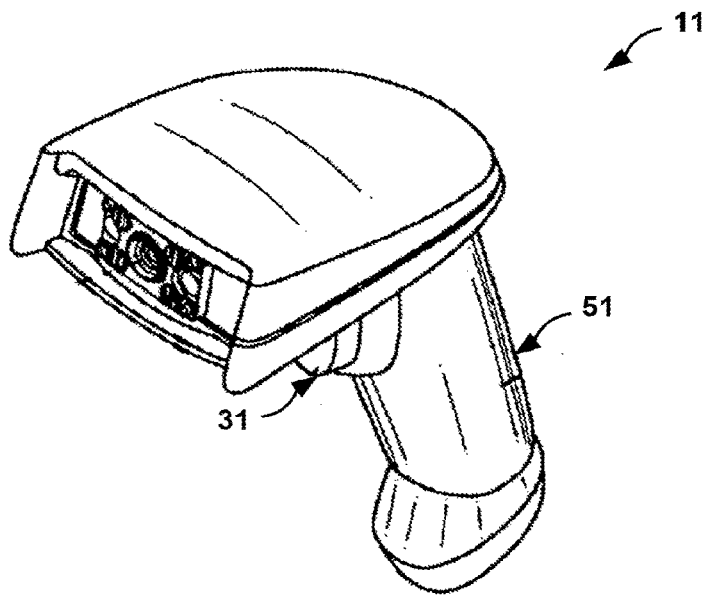
FIG. 3A is a drawing illustrating further details of an example wireless scanner having radio transceiver and an RFID reader.

FIG. 3A is a drawing showing wireless scanner 11. In this example, wireless scanner 11 includes manual actuator 31 and housing 51 that internally houses controller 8, radio transceiver 14, RFID reader 33, and bar code reader 34 of FIG. 2A. Housing 51 may be configured so that actuator 31 can be triggered when housing 51 is grasped by the user. In one embodiment, an RFID reader terminal may contain hand held housing 51 without a display and include at least one component of RFID reader unit 33, housing 51 being configured so that a user can trigger manual actuator 31 when grasping the housing, the RFID reading terminal being configured so that when the manual actuator is triggered, the RFID reader produces a decoded RFID data message. Controller 8 may process the decoded RFID data message from RFID reader unit 33 to determine an address for wirelessly communicating between wireless scanner 11 and wireless scanner base 21 to complete the pairing operation and automatic establishment of a communication session using a second RF protocol for data transfer.

Figure 3B:
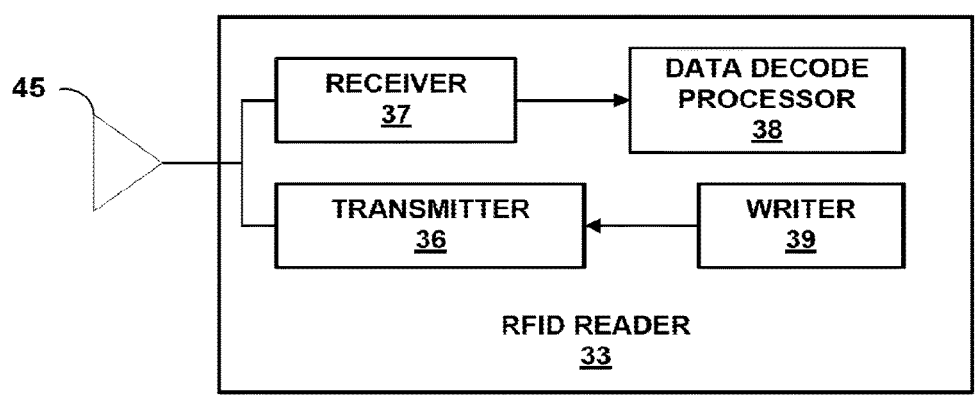
FIG. 3B is a block diagram showing example components of an RFID reader within a wireless scanner.

FIG. 3B is a block diagram illustrating components of an example RFID reader 33 that may be incorporated in wireless scanner 11 for use in automatically pairing the wireless scanner with a base station in accordance with the techniques described herein. In this example, RFID reader 33 includes transmitter 36, receiver 37, data decode processor 38, writer 39, and antenna 45. RFID reader 33 may be used to activate a passive RFID tag. The passive tag may include a storage device, a transponder, and an antenna. For activation of a passive tag, transmitter 36 may send an activation radio signal over antenna 45 which is received by an antenna for activation of the transponder. In response to the receipt of the activation signal, the transponder is actuated to transmit a radio signal representing identification data encoded into the passive tag. Receiver circuit 37 in turn receives the radio signal from the passive tag and converts the data into a processable digital format. Data decode processor 38 of RFID reader 33 typically includes a low cost microcontroller and processes the received radio signal information to decode the identification data originally encoded into the RFID tag. The RFID tag may be applied to, for example, articles for sale in a retail store, or to an identification card such as a credit or debit card. The RFID tag may also be used as a tool in reconfiguring wireless scanner 11 to uniquely associate with wireless scanner base 21. RFID reader 33 may be operated in a continuous read mode or in an active read mode. In an active read mode, RFID reader 33 attempts to read and reads data from a tag in response to a trigger signal being initiated. Wireless scanner 11 may be configured so that a trigger signal is initiated by depressing actuator 31 or another button of wireless scanner 11.

Figure 4:
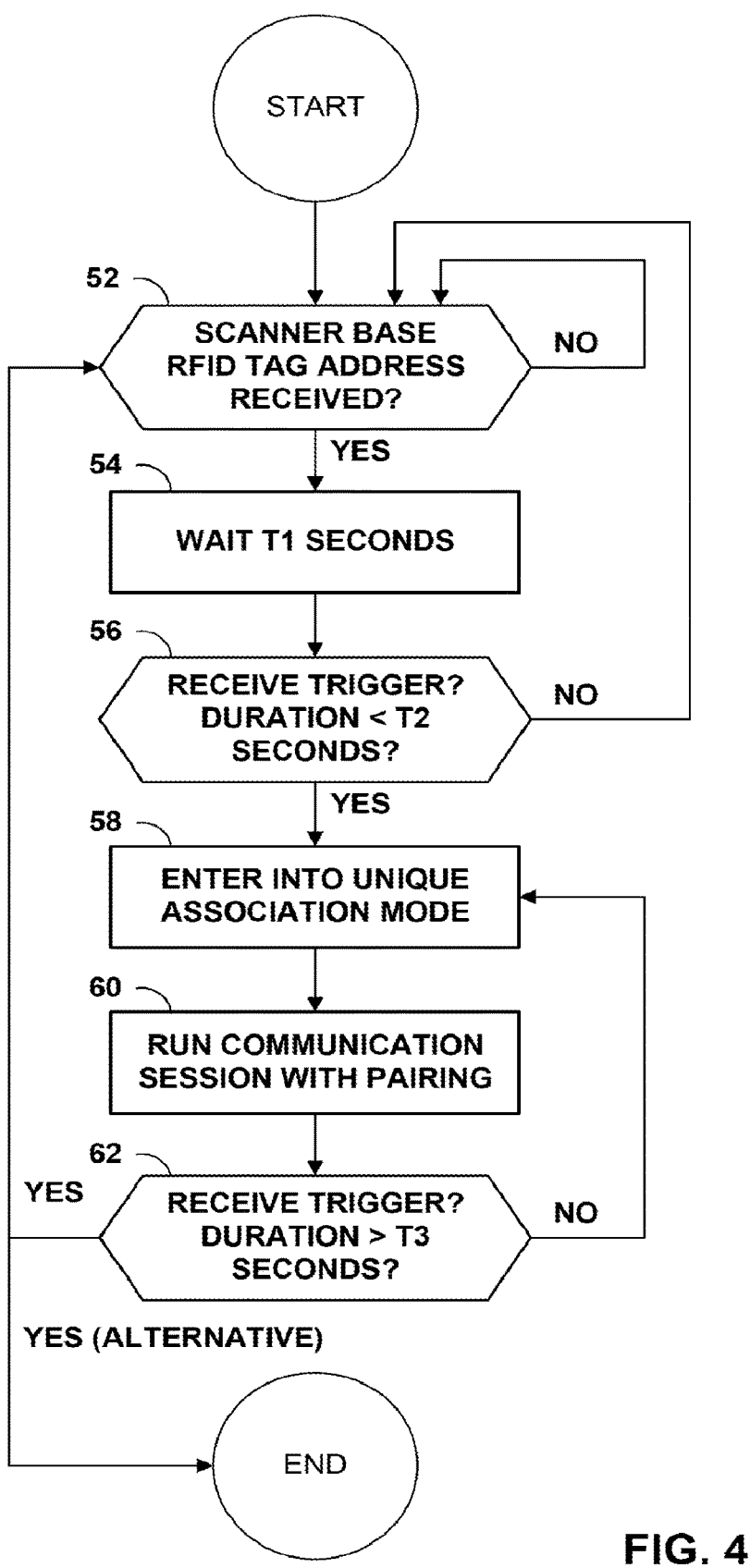
FIG. 4 is a flowchart illustrating example operation of a wireless scanner operating within a wireless scanner network in accordance with the techniques described herein.

FIG. 4 is a flowchart illustrating process steps that can be carried out by wireless scanner 11 operating within wireless scanner network 10. An RFID reading wireless scanner 11 may be configured to enter a unique association mode by triggering actuator 31 subsequent to wirelessly receiving an RFID tag address from one of a plurality of wireless scanner bases 21 in wireless scanner network 10. The flowchart will be described in the example in which wireless scanner 11 is first introduced into wireless scanner network 10, retains no previously obtained RFID tag address information or any other information regarding any wireless scanner base 21 in the wireless scanner network, and it is desired that the wireless scanner will operate together in unique association with one of the wireless scanner bases.

In this mode, controller 8 of wireless scanner 11 may begin the unique association mode of operation by executing an initial sampling loop (52) to confirm whether the wireless scanner has sensed and interrogated an RFID tag to receive an RFID tag address, which can be referred to as a scanner base address, from one of a plurality of wireless scanner bases 21. Controller 8 may activate indicator 19 once wireless scanner 11 has received an RFID tag address to notify the user that an RFID tag address has been acquired. If wireless scanner 11 receives a scanner base address, controller 8 waits for a first predetermined amount of time T1 seconds (54), such as 10 seconds. During this time, controller 8 of wireless scanner 11 determines whether a trigger signal is received from actuator 31 with a signal duration which is less than a second predetermined amount of time T2 seconds (56), such as 2 seconds. That is, actuation of actuator 31 for less than T2 seconds may be utilized as a confirmation by the user that the wireless scanner is to be paired with the wireless scanner base from which the RFID tag was read. Such confirmation causes controller 8 to enter into association mode in which the controller establishes the communication session with the wireless scanner base (58). Controller 8 remains in the first sampling loop if the initial trigger is not received in less than the first predetermined amount of time T1. For example, controller 8 may wait for a period of 10 seconds (T1) after acquiring the RFID tag address to receive a trigger signal of actuator 31 which is less than 2 seconds before completing the pairing operation of wireless scanner 11 with wireless scanner base 21.

In the unique association mode (58), controller 8 proceeds to conduct a paired communication session between wireless scanner 11 and wireless scanner base 21 (60) based on the scanner base address acquired from the RFID tag. For example, the scanner base address from the RFID tag may be an index into a translation table containing the wireless address of wireless scanner base 21. Each entry of the translation table associates a tag address with one wireless scanner base 21 in network 10 where a wireless network address or identifier may be used in constructing an RF communication session with that wireless scanner base. In another example, the wireless address for wireless scanner base 21 may be contained in the data section of the RFID tag. If controller 8 of wireless scanner 11 enters into the unique association mode (58) and enters into a normal mode of operation (60) during which actuator 31 may be triggered by the user to indicate an acquisition event for bar code reader 34 of wireless scanner 11 shown in FIG. 2A, then bar code scanning operation may proceed in which the wireless scanner transmits bar code data wirelessly to wireless scanner base 21 after each trigger event of actuator 31. This bar code data may be related to items for purchase in a retail store, for example, wherein the bar code of each item is scanned by wireless scanner 11 and the resultant bar code data is transferred to wireless scanner base 21 via the established communication session 17.

Wireless scanner 11 continues this operation while paired with the particular wireless scanner base until the wireless scanner receives a trigger from actuator 31 which is more than a third predetermined amount of time T3 (62), such as 5 seconds, at which point the controller exits the second sampling loop and proceeds back to the first sampling loop (52). Alternatively, in another embodiment, the user may specify that controller 8 of wireless scanner 11 may exit the unique association algorithm upon receipt of the trigger signal with a duration which is more than T3 seconds (62).

Various embodiments of the invention have been described. These and other embodiments are within the scope of the following claims.

What is claimed is:
1. A method comprising:
reading, with a radio frequency identification (RFID) reader, an RFID tag address from a RFID tag of an RFID reader base that is coupled to and separate from a point-of-sale device;
prior to pairing of the RFID reader with the RFID reader base, the RFID reader is configured to communicate with a plurality of RFID readers;
pairing the RFID reader with the RFID reader base indicated by the RFID tag address only in response to determining that that the RFID tag address is associated with the RFID reader; and
after the RFID reader is paired with the RFID reader base, transmitting data read from the RFID reader only to the RFID reader base that then transmits the data to the point-of-sale device so that the RFID reader base only relays the data between the paired RFID reader and the point-of-sale device without the data being processed by other devices within wireless range of the RFID reader base.

2. The method of claim 1, further comprising:
indicating to a user that the RFID reader has acquired the RFID tag address from the RFID reader base;
prompting the user for confirmation that the user approves wirelessly connecting from the RFID reader to the RFID reader base indicated by the RFID tag address;

receiving a confirming trigger signal indicating that the user approves wirelessly connecting from the RFID reader to the RFID reader base indicated by the RFID tag address; and automatically establishing a communication session from the RFID reader to the RFID reader base upon receiving the confirming trigger signal within a first predetermined amount of time after prompting the user provided the trigger signal duration is less than a second predetermined amount of time.

3. The method of claim 2, further comprising:
receiving the confirming trigger signal;
after receiving the confirming trigger signal, entering, with the RFID reader, a unique association mode of operation; and
establishing a communication session from the RFID reader to the RFID reader base, wherein in the unique association mode the RFID reader transmits data only to the RFID reader base with which the communication session has automatically been established.

4. The method of claim 3, wherein in the unique association mode of operation the RFID reader transmits data only to the RFID reader base indicated by the RFID tag address when initiating a network for the transmission of decoded message data to an external device.

5. The method of claim 3, further comprising disconnecting from the RFID reader base if the trigger signal allowing interrogation to recommence is actuated by the user for more than a third predetermined amount of time.

6. The method of claim 3, further comprising, if the RFID reader is in a disconnected state, attempting to reconnect to the RFID reader base using the RFID tag address from the RFID reader base in response to the trigger signal allowing interrogation to recommence.

7. The method of claim 1, further comprising:
obtaining the RFID tag address from the RFID reader base using a first RF protocol which is RFID;
using the RFID tag address as an identifier for pairing with the RFID reader base;
using the RFID tag address as an index in a translation table stored within the RFID reader to select a network address of a second RF protocol for the RFID reader base; and
using the network address of the second RF protocol to establish the wireless communication session.

8. The method of claim 1, further comprising:
reading the RFID tag address from the RFID reader base using a first RF protocol which is RFID;
reading an identifying address for the RFID reader base from the RFID tag, wherein the address conforms to a second RF protocol different from an RFID protocol; and
using the address for automatically establishing the wireless communication session.

9. A method comprising:
reading by, a controller coupled to the radio frequency identification (RFID) reader, an RFID tag address received from an RFID reader base that is coupled to and separate from a point of sale device;
establishing, by the controller, a wireless communication session sharing data and command between the RFID reader to the RFID reader base indicated by the RFID tag address,
wherein the RFID reader base communicates data between the RFID reader and the point of sale device via the RFID reader base so that the RFID reader base can relay the data between the RFID reader and the point-of-sale device without the data being processed by other devices within wireless range of the RFID reader base.

10. The method of claim 9, further comprising:
an actuator for generating trigger signals; and
an indicator;
wherein the controller activates the indicator to notify a user that the RFID reader has acquired the RFID tag address from the RFID reader base;
wherein the controller prompts the user for confirmation that the user approves wirelessly connecting from the RFID reader to the RFID reader base indicated by the RFID tag address; and
wherein the controller automatically establishes the wireless communication session upon receiving a trigger signal confirming that the user approves wirelessly connecting from the RFID reader to the RFID reader base indicated by the RFID tag address.

11. The method of claim 10, wherein:
the controller, with the indicator, prompts the user to trigger the actuator; and
if the controller receives a trigger signal in less than a first predetermined amount of time and the actuator is triggered for a duration less than a second predetermined amount of time, the controller automatically establishes the wireless communication session.

12. The method of claim 10, wherein the controller disconnects the RFID reader from the RFID reader base in response to the actuation of the actuator for more than a third predetermined amount of time.

13. The method of claim 10, wherein:
after the controller establishes a wireless communication system, if the RFID reader becomes disconnected from the RFID reader, the controller attempts to reconnect the RFID reader to the RFID reader base indicated by the RFID tag address in response to the actuation of the actuator.

14. The method of claim 9,
wherein the controller obtains the RFID tag address from the RFID tag of the RFID reader base using a first RF protocol,
wherein the controller uses the RFID tag address as an index into a translation table stored within the RFID reader to select a network address of a second RF protocol for use in establishing the wireless communication session with the RFID reader base in accordance with the second RF protocol.

15. The method of claim 9, wherein:
the controller reads a network address of a second RF protocol from an RFID tag on the RFID reader base; and
uses the second RF protocol to establish the wireless communication session with the RFID reader base in accordance with the second RF protocol.

16. The method of claim 9, wherein, after automatically establishing the wireless communication session with the RFID reader base, the RFID reader enters into a unique association mode of operation in which the RFID reader transmits data only to the RFID reader base with which the communication has automatically been established, wherein, in the unique association mode of operation, the RFID reader transmits data only to the RFID reader base indicated by the RFID tag address when initiating a network for the transmission of decoded message data to an external device.

17. A method comprising:
  reading, by a radio frequency identification (RFID) reader, an RFID tag associated with an RFID reader base that is not a point of sale device;
  establishing a wireless communication session between the RFID reader and the RFID reader base corresponding to the read RFID tag only in response to determining that the RFID reader is associated with the RFID base based on information obtained by the RFID tag;
  using the session to send and receive commands and data to and from the RFID reader base, and the base then communicating between the point of sale device that is separate from the RFID reader base so that the RFID reader base can relay the data between the RFID reader and the point-of-sale device without the data being processed by other devices within wireless range of the RFID reader base.

18. The method of claim 17, further comprising, after the reading of an RFID tag address the controller disallows interrogation of RFID tags until a predetermined event occurs.

* * * * *